United States Patent [19]
Crinon et al.

[11] Patent Number: 5,228,098
[45] Date of Patent: Jul. 13, 1993

[54] ADAPTIVE SPATIO-TEMPORAL COMPRESSION/DECOMPRESSION OF VIDEO IMAGE SIGNALS

[75] Inventors: Regis J. Crinon, Aloha; Ajay Luthra, Beaverton, both of Oreg.; Peter M. May, Mountain View, Calif.; Stanley C. Edwards, Hillsboro, Oreg.

[73] Assignee: Tektronix, Inc., Wilsonville, Oreg.

[21] Appl. No.: 715,288

[22] Filed: Jun. 14, 1991

[51] Int. Cl.$^5$ ............................................. G06K 9/36
[52] U.S. Cl. ....................................... 382/56; 382/37
[58] Field of Search ............... 382/56, 37; 358/133, 358/433, 261.3, 136

[56] References Cited

U.S. PATENT DOCUMENTS

| | | | |
|---|---|---|---|
| 4,698,689 | 10/1987 | Tzou | 358/433 |
| 4,831,659 | 5/1989 | Miyaoka et al. | 382/56 |
| 4,944,023 | 7/1990 | Imao et al. | 382/37 |
| 4,947,259 | 8/1990 | Katsuta | 358/426 |
| 5,008,747 | 4/1991 | Carr et al. | 358/136 |
| 5,022,091 | 6/1991 | Carlson | 382/56 |
| 5,060,285 | 10/1991 | Dixit et al. | 382/56 |

OTHER PUBLICATIONS

M7.8 "Space-Variant Regular Decomposition Quadtrees in Adaptive Interframe Coding" by P. Strobach, D. Schutt, W. Tengler; Siemens AG; CH2561-9/88/00-00-1096; 1988 IEEE; pp. 1096-1099.

*Primary Examiner*—Michael T. Razavi
*Assistant Examiner*—Yon T. Couso
*Attorney, Agent, or Firm*—Francis I. Gray

[57] ABSTRACT

An adaptive spatio-temporal compression/decompression algorithm for a video image uses a quadtree hierarchy to represent each frame of the image, the quadtree hierarchy including intermediary nodes and leaves. For each leaf a temporal bit is added indicative of whether a significant intensity change occurred between two frames of the video image. If the temporal bit indicates the significant intensity change occurred between frames, then a new intensity value also is added to that leaf. A decoder using a state machine extracts from the resulting compressed data stream a start address, a block size and the new intensity value for each leaf having the significant intensity change between frames to update a display memory with the new intensity value at each pixel within the area defined by the start address and block size.

7 Claims, 13 Drawing Sheets

ADAPTIVE SPATIO-TEMPORAL COMPRESSION/DECOMPRESSION OF VIDEO IMAGE SIGNALS

BACKGROUND OF THE INVENTION

The present invention relates to digital compression/decompression algorithms for digital data sequences, and more particularly to an adaptive spatio-temporal compression/decompression algorithm for video image signals using a spatio-temporal quadtree based encoder and a corresponding decoder.

Often video images are made up of large uniform areas with a few detailed areas in which the image is uniform only locally. To represent this image digitally a two-dimensional array is sampled by taking an intensity or color sample at regularly spaced intervals known as picture elements, or pixels. The value for each pixel is quantized to eight bits, or for color images three values are quantized to eight bits, one each for red, blue and green, for a total of twenty-four (24) bits. The sampled video color image may also be represented by a luminance component and two chrominance components having one-half the bandwidth of the luminance component. In this case the size of the sampled chrominance fields is one-half the size of the sampled luminance field because of the reduced bandwidth and only sixteen bits per pixel are required, eight for the luminance component and eight for the associated one of the chrominance components. The data rate transmission capability for sending such image data in realtime over transmission lines is on the order of up to 160 Mbits/sec for NTSC video and up to 2 Gbits/sec for HDTV video. For facsimile transmission or teleconferencing where ordinary telephone transmission lines are used, the available data rate is approximately 2-10 kbits/sec. Even where the video image is to be stored, current magnetic disc technology is limited to data rates of approximately 8 Mbits/sec. Therefore some mechanism is required for reducing the amount of data without reducing picture content to achieve realtime video rates for storage and playback of video sequences, as well as for facsimile transmission or teleconferencing.

Since a video image is largely static from frame to frame, a technique is required for representing the large uniform areas in a compressed form with only differences from frame to frame being transmitted after the initial frame has been developed. Such a technique is described by Strobach et al of Siemens A. G., Munchen, Germany in an article entitled "Space-variant Regular Decomposition Quadtrees in Adaptive Interframe Coding", Proceedings of the International Conference on Acoustics, Speech and Signal Processing, ICASSP-88, Vol. II, pp. 1096-1099. Strobach et al describe a scene adaptive coder that is based on a quadtree mean decomposition of the motion compensated frame-to-frame difference signal followed by a scalar quantization and variable wordlength encoding of the local sample. The displacement vector is determined in a sense such that the resulting quadtree decomposition attains a minimum in terms of a minimum number of bits required for encoding. This is referred to as quadtree structured difference pulse code modulation (QSDPCM).

The quadtree is a hierarchical data structure for describing two-dimensional regions, and is often used to store binary pictures. Strobach et al use the bottom-up realization where four adjacent subblocks are tested to see if they are homogeneous with respect to the property of interest. If the test is positive, the four subblocks are merged into a new subblock which has four times the size of its immediate predecessor. The procedure is repeated recursively until the largest possible block size is reached. The merge test is conducted by comparing the sample mean of each adjacent subblock with the merged (larger) subblock, and performing the merge if the difference between the sample mean for the merged subblock and each adjacent subblock is less than a predetermined quality threshold. This technique provides for direct motion compensated prediction (MCP) error coding with smaller computational complexity than conventional motion compensated transform coders.

The Strobach et al interframe approach, however, outputs only averaged frame difference sample values, i.e., provides only spatial difference values. The Strobach et al decoder, therefore, requires an additional adder.

What is desired is a compression/decompression scheme for video image signals that is based upon an adaptive spatio-temporal algorithm to produce a simple decoder.

SUMMARY OF THE INVENTION

Accordingly the present invention provides an adaptive spatio-temporal compression/decompression technique for video image signals that provides as outputs from an encoder averaged sample values from the frame being encoded. The encoder adds a bit to each leaf of a quadtree decomposition as a temporal dimension that indicates whether or not the intensity difference between frames is approximately zero. If the intensity difference is not zero, then three intensity values for the red, blue and green values of that leaf of the quadtree are included. The decoder uses the encoding rules from the top of the quadtree for decompresssion, and outputs an X,Y coordinate, a block size and RGB intensity values for the blocks that need to be replenished. The decoder values are stored in a memory from which the transmitted video image may be recreated by a local graphics processor that is optimized for addressing and filling frame buffer blocks of any size.

The objects, advantages and other novel features of the present inventions are apparent from the following detailed description when read in conjunction with the appended claims and attached drawing.

DESCRIPTION OF THE PREFERRED EMBODIMENT

Figure 1:
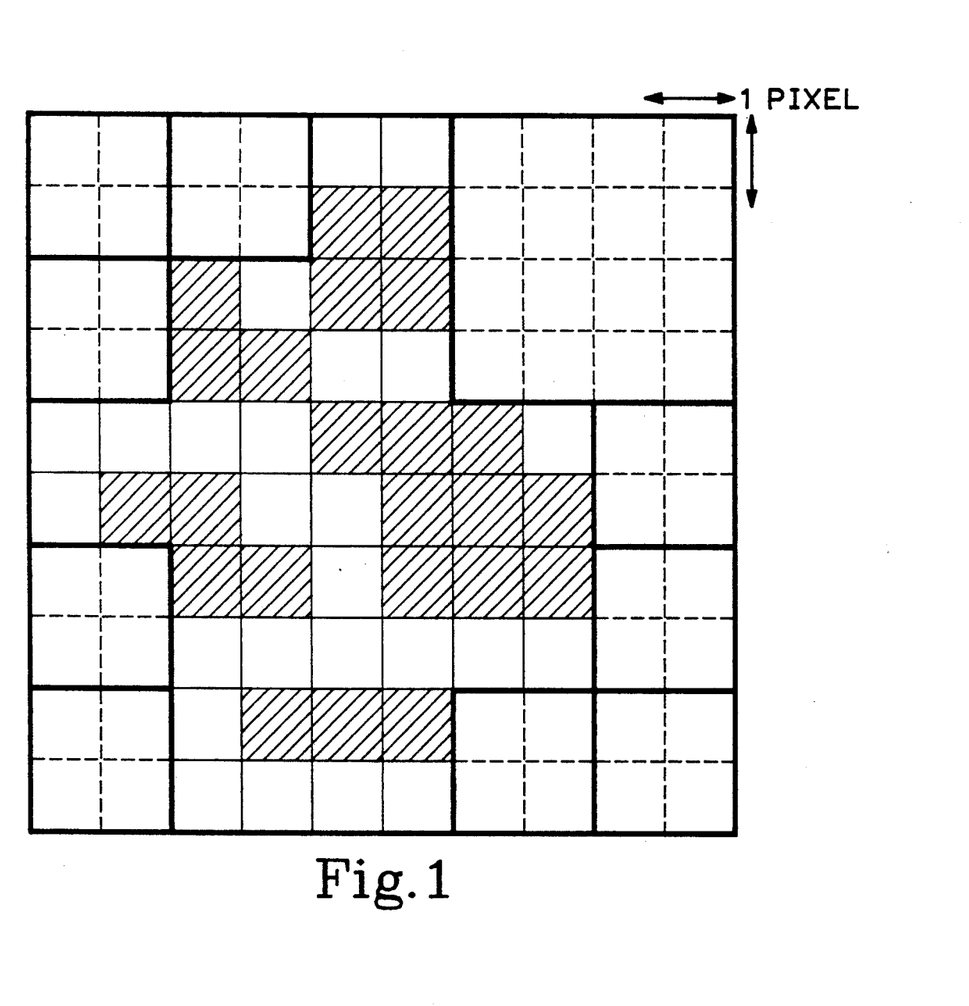
FIG. 1 is a pictorial representation of the result of the adaptive sampling scheme of the present invention on a simple picture.

FIG. 1 shows a simple picture featuring large and small uniform grey areas. The large uniform areas make up most of the picture, but there are a few detail areas in which the picture is uniform only locally. To represent this picture digitally the picture is treated as a two-dimensional array of pixels, represented by the small squares shown, with each pixel being sampled to obtain an intensity value, usually quantized into eight bits for a grey scale representation. For a color picture each pixel has three values of eight bits each, one value for each of red, blue and green fundamental colors for a total of twenty-four bits. Such a regular pixel sampling lattice introduces a large degree of redundancy in the digital representation of the image as many pixels carry the same intensity values. An adaptive sampling scheme effectively relaxes the sampling frequency in large uniform areas while keeping the high sampling rate in the detailed area of the picture, producing the final block image shown where block sizes range from one pixel to sixteen pixels. For larger pictures the block sizes range from one to $2^n$, where n is an integer, depending upon the amount of redundancy within the picture. The largest possible block covers the entire image square, and smaller blocks are obtained by recursively splitting up each block into four subblocks. The smallest block may represent a pixel value, or even sub-pixel values.

Figure 2:
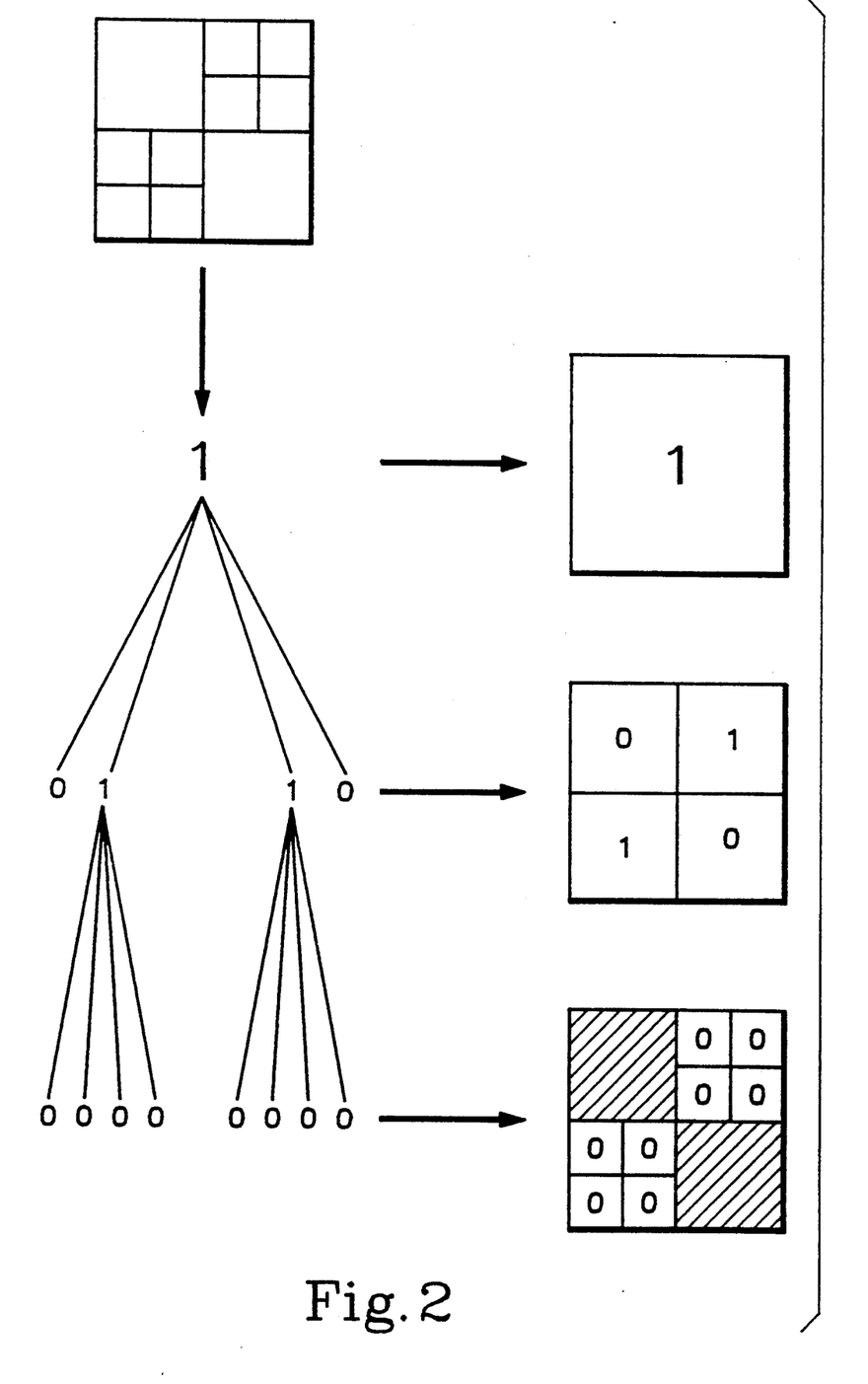
FIG. 2 is a pictorial representation of a spatial quadtree representation for a simple picture.

Referring now to FIG. 2 the resulting sampling structure can be encoded in a very compact form using a quadtree representation. For the sake of simplicity a block of 4×4 pixels is shown, but the scheme works equally well for larger images. A "1" represents an intermediary node while a "0" represents a leaf. A set of red, blue and green intensity values is attached to every leaf in the tree. This scheme may be used to sample the difference field between two successive frames in a video sequence. Typically most of the picture content is repeated from one frame to another, translating into large uniform regions where the difference is approximately zero. These uniform areas become large blocks in the quadtree representation. The edges in the difference field are due to the fact that objects have slightly moved from one frame to another, and these edges are sampled with the highest sampling rate as shown in the Strobach et al reference cited above.

Figure 3:
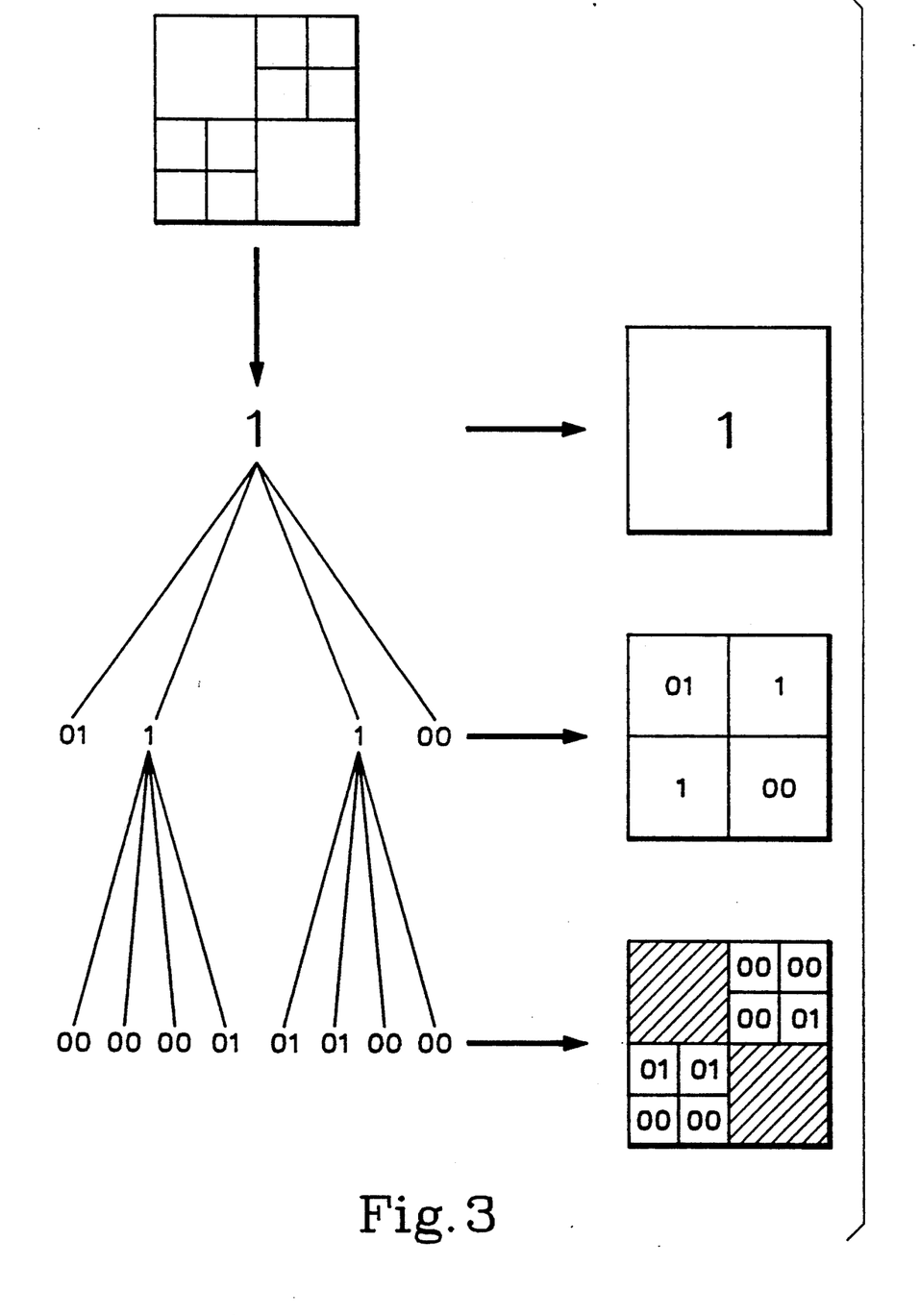
FIG. 3 is a pictorial representation of a spatio-temporal quadtree representation of the simple picture of FIG. 2 according to the present invention.
Figure 4:
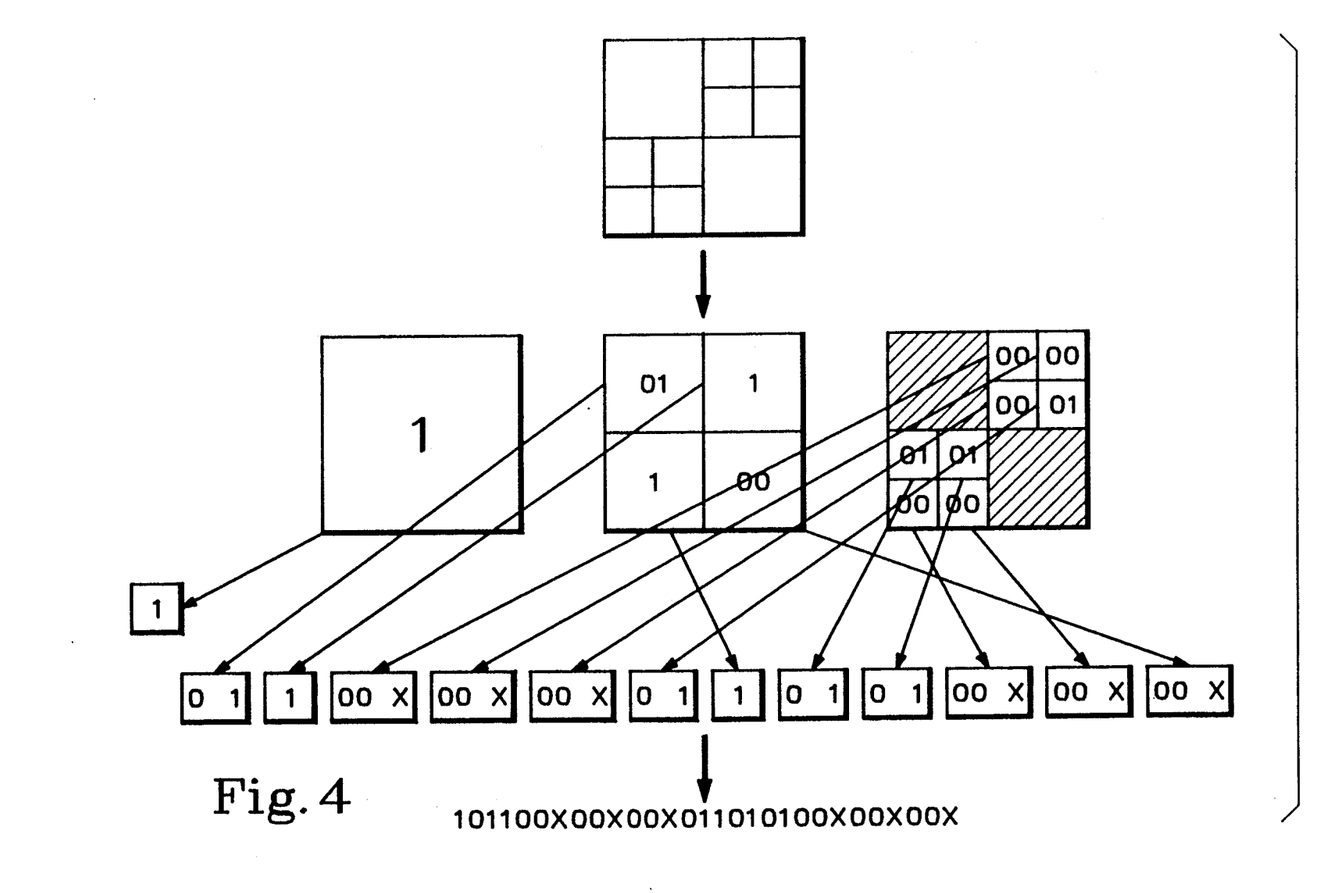
FIG. 4 is a pictorial representation of the encoding of the simple picture of FIG. 2 based on the spatio-temporal quadtree representation of FIG. 3.

Because most of the frame difference values are approximately zero, a temporal dimension is added to the quadtree representation shown in FIG. 2. For every leaf in the tree an additional bit is added to indicate whether or not the intensity difference is zero. If the intensity difference is null, the additional bit is "1". If the intensity difference is not null, then the additional bit is "0" and the intensity values for that leaf are added. The resulting new spatio-temporal quadtree-based encoding of the sampling structure is shown in FIG. 3. Again a small block of 4×4 pixels is shown, "1" is still an intermediary node and the leaves are represented either by "01" or "00." The "00" leaves are followed by the intensity values. Thus the format expected by the decoder is determined by a pair of rules as illustrated in FIG. 4.

The first encoding rule for packing the image data is: given any parent intermediary node "1" in the tree, the four children, "1" or "01" or "00" followed by intensity values, in the tree are sent following a Z-pattern from left to right on each line starting at the upper left corner, i.e., scanning the four blocks in the order of upper left corner, upper right corner, lower left corner and lower right corner. Whenever one of these children nodes happens to be an intermediary node "1", the second rule interrupts the regular Z-pattern scanning to initiate another Z block at the next lower level in the tree where the block size is smaller by one-half. The result of applying these two rules recursively from the top of the tree, where the block size is largest, down to the bottom of the tree, where the block size is smallest, i.e., one pixel, provides the bit stream expected at the input to a decompression circuit.

Figure 5:
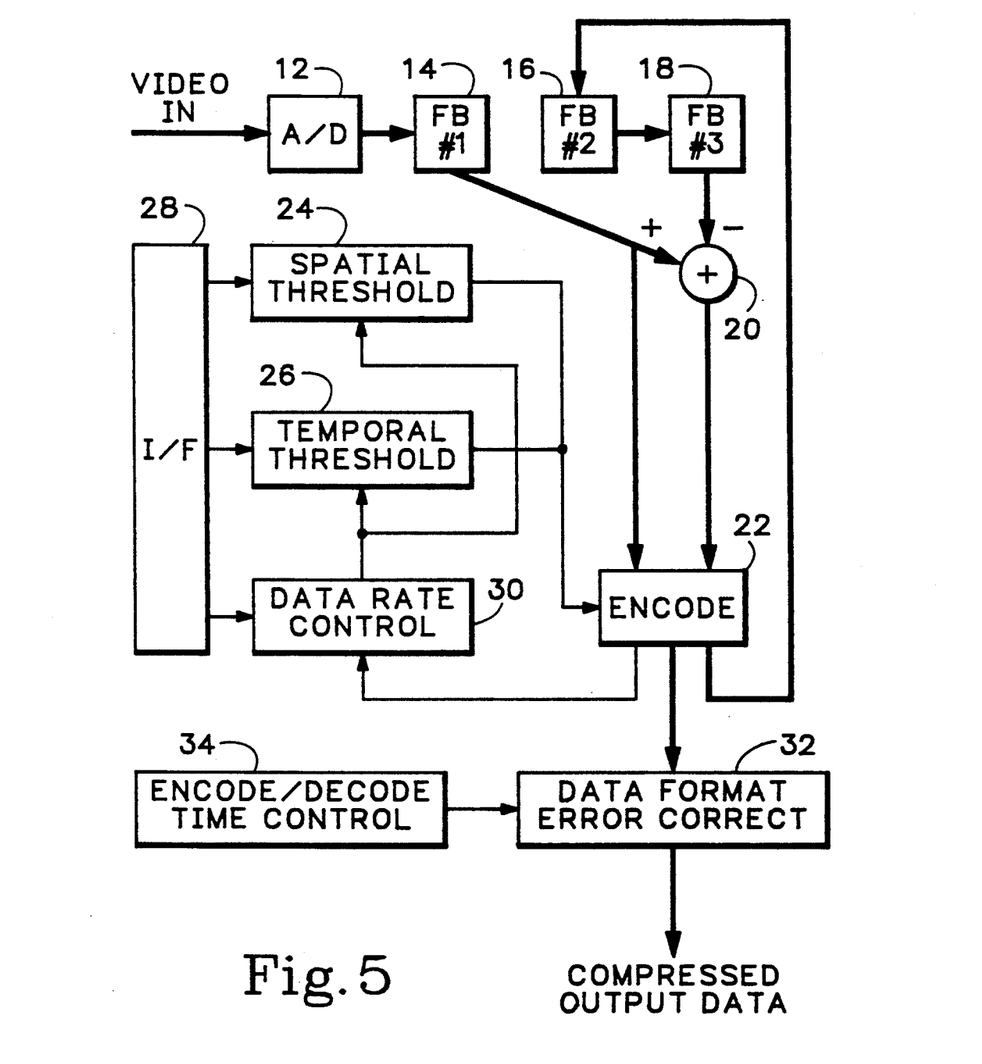
FIG. 5 is a block diagram of a first embodiment for an encoder according to the present invention.

Referring now to FIG. 5 an encoder is shown that is designed to provide a continuous stream of data over a digital channel with limited bandwidth, such as for video conferencing. The encoder is designed to maintain the average bit rate at its output so there is a good match between channel capacity and output bit rate. The encoder receives an input video signal and produces a compressed output signal for transmission over a communications line. The input video signal is quantized by an analog-to-digital (A/D) converter 12 and input to a first frame buffer 14. Second and third frame buffers 16, 18 contain the two previous frames of video data as they would appear at the output of a decoder/decompressor. The content of the second frame buffer 16 is shifted into the third frame buffer 18 as each new frame of video data is received by the first frame buffer 14. The data from the first and third frame buffers 14, 18 are input to a summer 20 to generate a signal representing the temporal difference between the new incoming frame of video data and immediately preceding frame of displayed video data. The video data from the first frame buffer 14 and the summer 20 are input to an encoding circuit 22 that applies the two encoding rules as recited above. Also the encoding circuit 22 reproduces the output of a corresponding decoding algorithm and dumps the results into the second frame buffer 16 so that ultimately this frame buffer contains a copy of the decoded/decompressed version of the video frame that was last compressed and encoded. Spatial and temporal quality threshold values are input to the encoding circuit 22 from spatial and temporal threshold circuits 24, 26. These threshold values help the encoding circuit 22 evaluate the amount of new image information brought in by the new video frame. An operator inputs parameters via an interface circuit 28 to the spatial and temporal threshold circuits 24, 26 and to a data rate control circuit 30. The data rate control circuit uses past information from the encoding circuit 22 to set the maximum number of bits that the next compressed frame takes by changing the value of the spatial and temporal quality threshold values. The encoded data from the encoding circuit 22 is input to a data formatting and error correction circuit 32 under control of timing from an encoder/decoder time control circuit 34. The output from the data formatting and error correction circuit 32 is the compressed video data for transmission over transmission lines or storage in a memory medium, such as a digital tape recorder.

Figure 6:
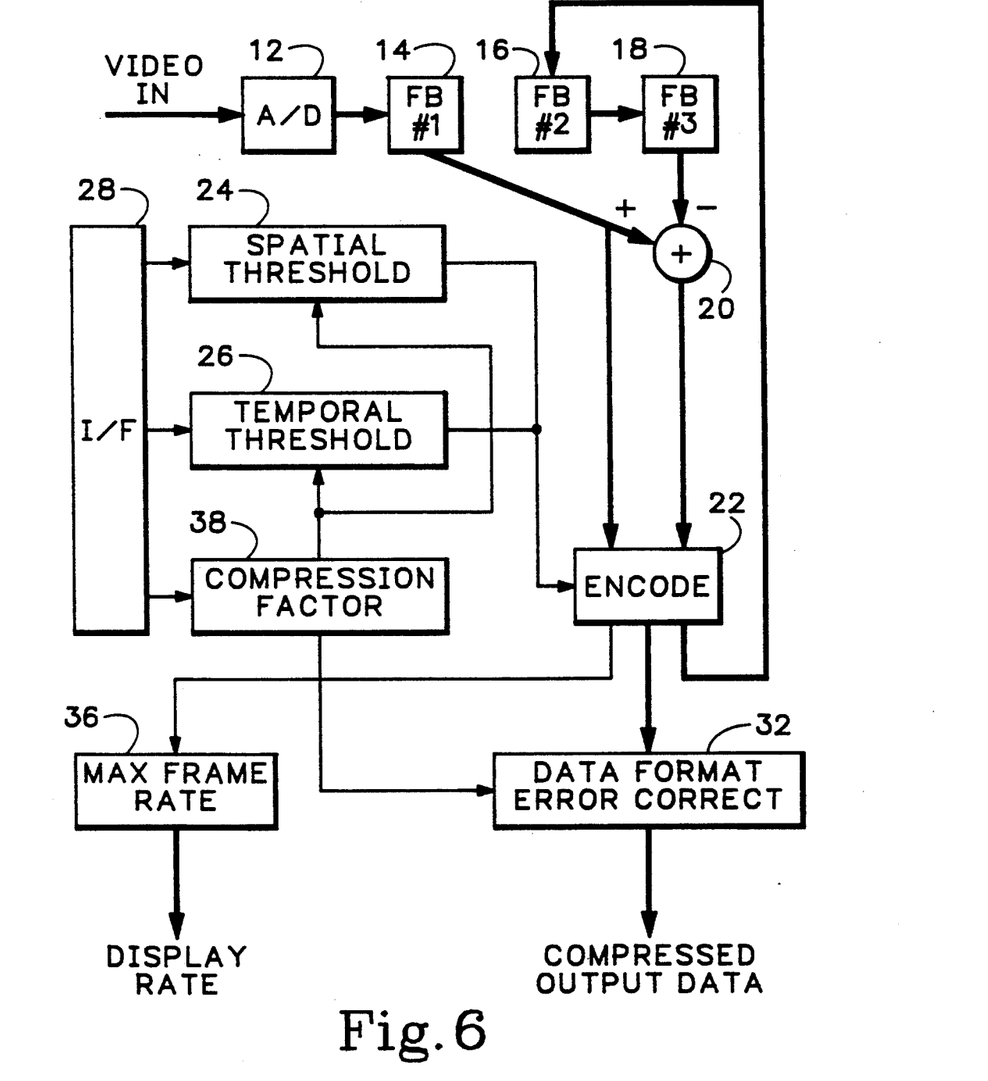
FIG. 6 is a block diagram of a second embodiment for an encoder according to the present invention.

Alternatively as shown in FIG. 6 the encoder may be designed to compress relatively short video sequences or a finite number of frames in a sequence, such as for compression of a particular animation sequence. Each frame of the input video signal is encoded by the encoding circuit 22 using the same spatial and temporal quality values. Given the length of the largest compressed frame from the encoding circuit 22, i.e., the frame containing the largest degree of detail, a maximum frame rate circuit 36 generates a highest frame rate that the decoder can sustain and sends this frame rate value to the decoder once the compressed sequence has been transmitted. A compression factor circuit 38 is used to modify the spatial and temporal threshold circuits 24, 26 as required, as well as providing the timing for the data formatting and error correction circuit 32. In both the encoder designs of FIGS. 5 and 6 the data formatting and error correction circuit 32 formats the data bit stream according to the format expected by the decoder and adds error correction bits to provide a more reliable transmission.

Figure 7A:
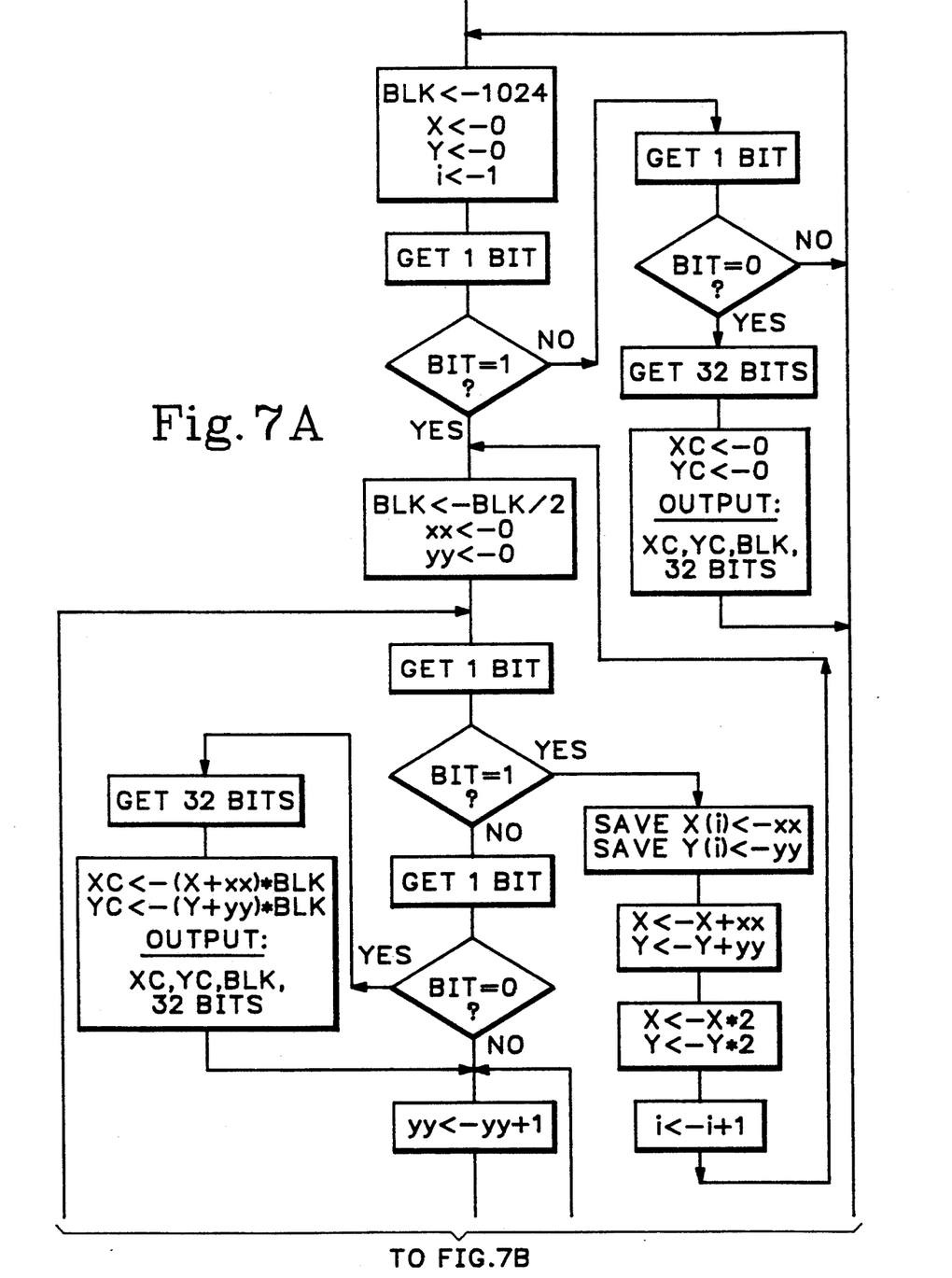
FIG. 7 is a flow chart of a decompression algorithm according to the present invention.
Figure 7B:
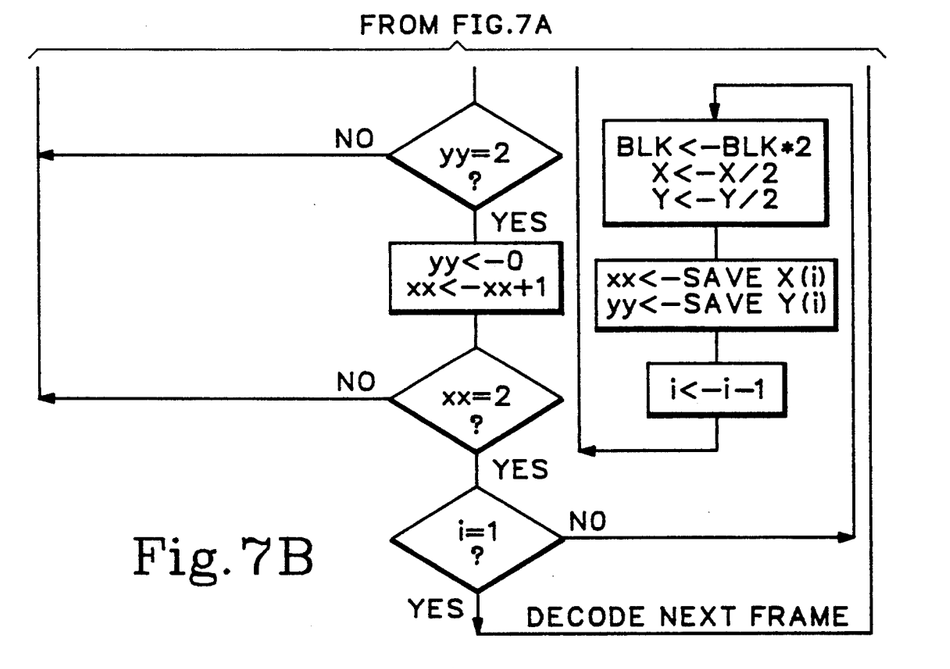

The decompression algorithm implemented by the decoder is shown in FIG. 7. Initially the block value BLK is set to the largest block value for the image, i.e., the highest level of the quadtree hierarchy. In this example a 1024×1024 pixel image is assumed. The X,Y coordinates are set to the upper left corner of the screen (0,0), and an index "i", indicative of the quadtree hierarchy level, is set to one. The first bit in the data stream is examined to determine whether it represents an intermediary node "1". If the first bit is zero, representing a leaf having a single intensity value for the entire image, then the next bit is tested to determine whether the entire image has changed "00" or not "01", equivalent to a steady image from frame to frame. If the image has changed, leaf "00", then the next thirty-two bits, 24 bits of color RGB intensity values and eight bits of alpha channel value, are output to provide an X,Y coordinate for the frame (XC,YC=0,0), the block size BLK=1024, and the 32 bits of intensity plus channel values.

However with actual video data the first bit usually indicates an intermediary node "1" for the entire frame. The block size is then divided by two to go to the next lowest level of block size and new initial coordinate values (xx,yy=0,0) are established. The next bit is tested to determine if the new block is an intermediary node "1" or a leaf "0". If it is an intermediary node then the location (xx,yy) is saved (SAVEX(i),SAVEY(i)), X,Y are incremented by the value of xx,yy, the X,Y values are doubled, and the index "i" is incremented. The process is repeated, dividing the block size BLK again by two to get to the next lowest level.

If the block size represents a leaf "0", then the next bit is tested to determine whether there is a change "00" or not "01". If there is a change, then the next thirty-two bits of intensity values are obtained, the starting location XC,YC for the block is set equal to (X+xx)*BLK,(Y+yy)*BLK, and the values, block size and starting location values are output. Then the value of yy is incremented to move to the next adjacent block in the Z-pattern. If yy after incrementing is two, indicating that both blocks one and two of that leaf have been examined, then yy is reset to zero and xx is incremented. If both yy and xx are two, indicating that this block level, or leaf, has been completed, then the index is tested.

If the index indicates that the block size is at the largest (i=1), then the next frame is accessed and the entire process starts again. However if the index is not equal to one, then the next highest block size level is entered by multiplying the block size by two, dividing the X,Y position by two, retrieving the values of xx,yy from SAVEX(i),SAVEY(i) for that index value, and decrementing the index. In this way the decompression algorithm follows the same rules as the encoding algorithm by decoding the upper left corner of the picture first and, through recursive up and down jumps in the tree, decoding the image according to the defined Z-pattern. What is output is a series of block information that contains the block size, the starting positions, and the intensity values for each block.

The block coordinates, block sizes and intensity values are used by a local processor to address and refresh corresponding display memory locations. Given a set of block coordinates, block size and intensity values the processor addresses every individual pixel in the block and updates its memory content with the new RGB intensity values, repeating this process for every block to be updated. The output of the graphics processor is coupled to two buffers, one of which is displayed while the other is filled up. Once the second buffer is filled up, the system waits until the display of the first buffer is complete before the second buffer is in turn displayed and the first buffer replenished. The frame rate is a predetermined number defining how long each frame is to be displayed. To ensure that every pixel within a frame is scanned N times, the frame rate is set to 30/N frames per second, where N=1, 2, 3, 4, ... (an integer). Thus the frame rate is 30, 15, 10, 7.5, ... frames per second. The frame rate is chosen so that the time required to display one frame is larger than the time taken to decompress any frame in the sequence. The value of the frame rate may be defined either by a user or by the encoder, as in FIG. 6. If N is selected by the user, the encoder makes sure that the time taken to decompress a frame does not exceed N/30 second. The encoder assures this by monitoring the number of blocks to be replenished in every frame. If too many blocks need to be replenished, the encoder reduces the amount of spatial detail in the frame being compressed, i.e., the spatial quality threshold value is reduced, which leads to decreasing the number of blocks to be updated. This reduces the frame decompression time. Conversely the number of leaves in the quadtree may be increased if the time required to decompress a frame is much lower than N/30 second. Therefore the picture quality may differ from frame to frame.

If, as in most cases, the user wants a constant quality image throughout the video sequence, the encoder selects the frame rate so that the decompressor in the decoder always has enough time to decode a frame. Here the encoder identifies the frame in the sequence requiring the most decompression time and chooses N accordingly, as shown in FIG. 6. In this way picture quality is constant throughout the video sequence but the frame rate is dictated by the performance of the decompression system in the decoder. In either case the value of N is transmitted to the decoder's decompression algorithm. Frames requiring less than 1/30th second of decompression time have to wait at least (N−1)/30 second before being displayed, frames requiring less than 2/30th second for decompression have to wait at least (N−2)/30 second before being displayed, etc. In a storage system the value of N or the frame rate of 30/N frames per second is either appended to the beginning of the compressed sequence or resides in a separate file, since the encoder can deliver the value N only after having compressed the entire sequence.

Figure 8:
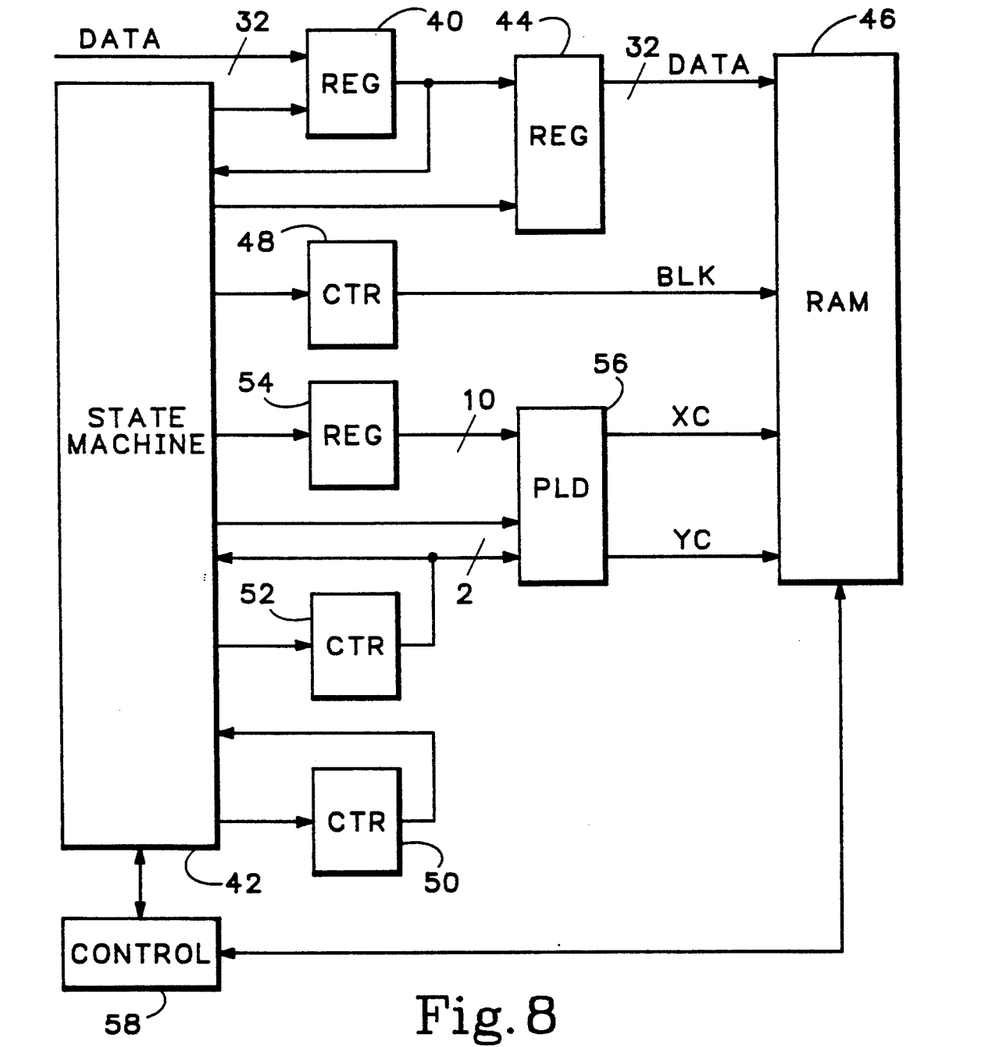
FIG. 8 is a block diagram of a decoder according to the present invention.

Referring now to FIG. 8 the compressed data stream output from the encoder is input to the decoder in parallel digital form, 32 bits for the present example. The data is input to a first shift register 40 that converts the data into serial data under control of a state machine 42. The serial data from the first shift register 40 is input to both the state machine 42 and to a second shift register 44. The second shift register 44 under control of the state machine 42 outputs the pixel data for storage in a memory 46, such as a RAM. The memory 46 has two memories so that one memory can be read out for display while the other is being filled by the decoder. A block counter 48 counts each increment/decrement of the index "i" that indicates the block size BLK, which block size is transferred also to the memory 46 with the pixel data. A bit counter 50 is used by the state machine 42 to count the bits in each 32 bit intensity/channel value data word. A "child" counter 52 counts each "child" of a leaf of the quadtree under control of the state machine 42 as one of four children—upper left, upper right, lower left and lower right. A mask register 54 under control of the state machine 42 provides an address offset. The address offset from the mask register 54, the child count from the child counter 52 and a control signal from the state machine 42 are input to a programmable logic device (PLD) 56 that produces the starting address XC,YC for the block for which pixel data is output. This address also is provided to the RAM 46. A controller 58 provides timing for the state machine 42 and coordinates the transfer of the pixel data, block size and start address to the appropriate buffer of the memory 46.

Figure 9A:
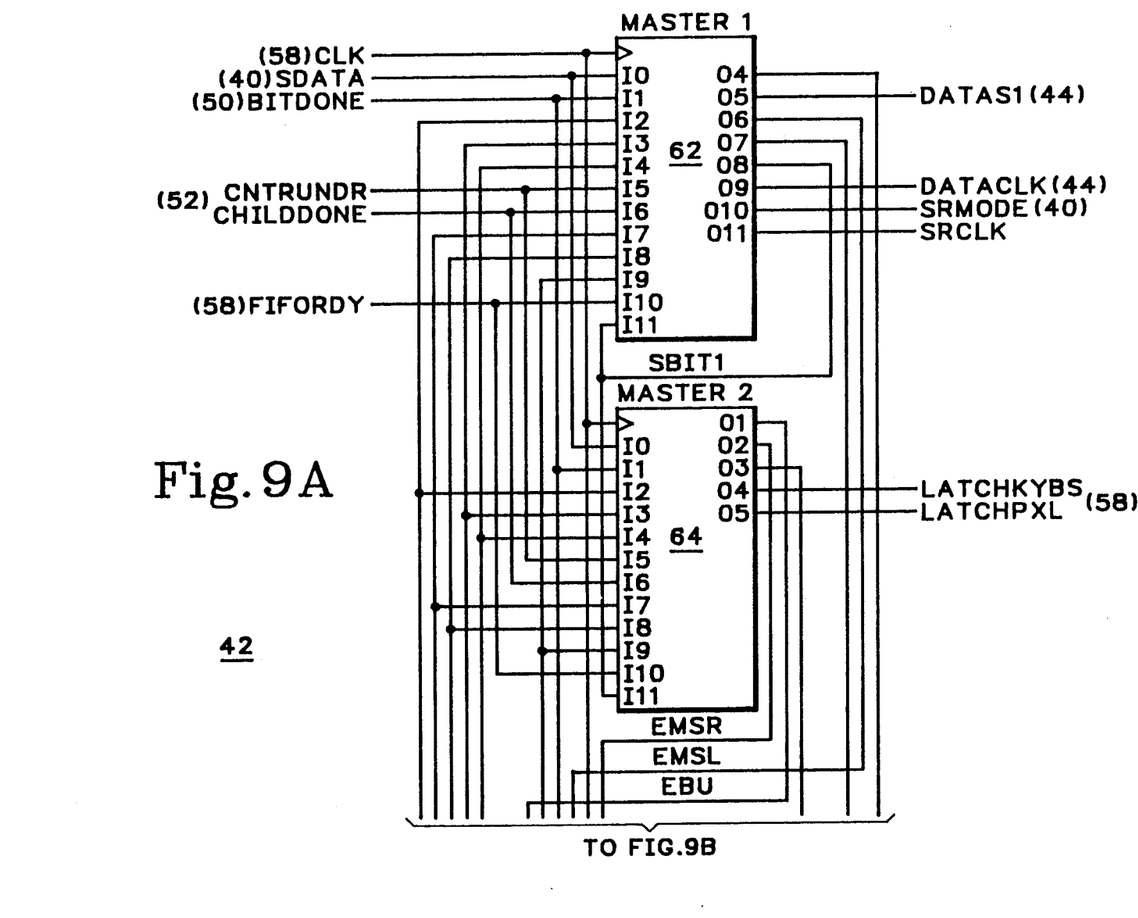
FIG. 9 is a schematic diagram of a state machine for the decoder of FIG. 8.
Figure 9B:
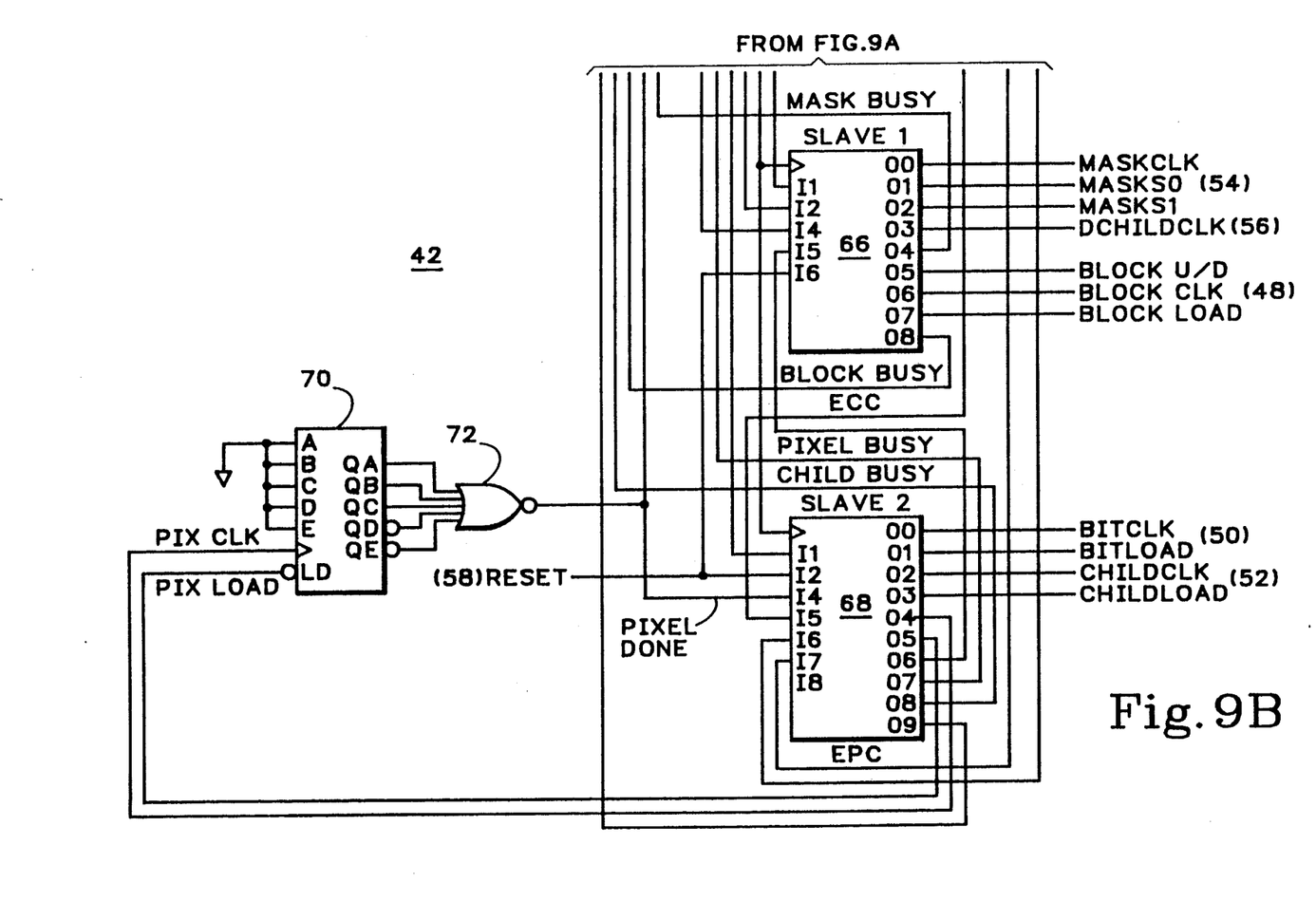
Figure 10:
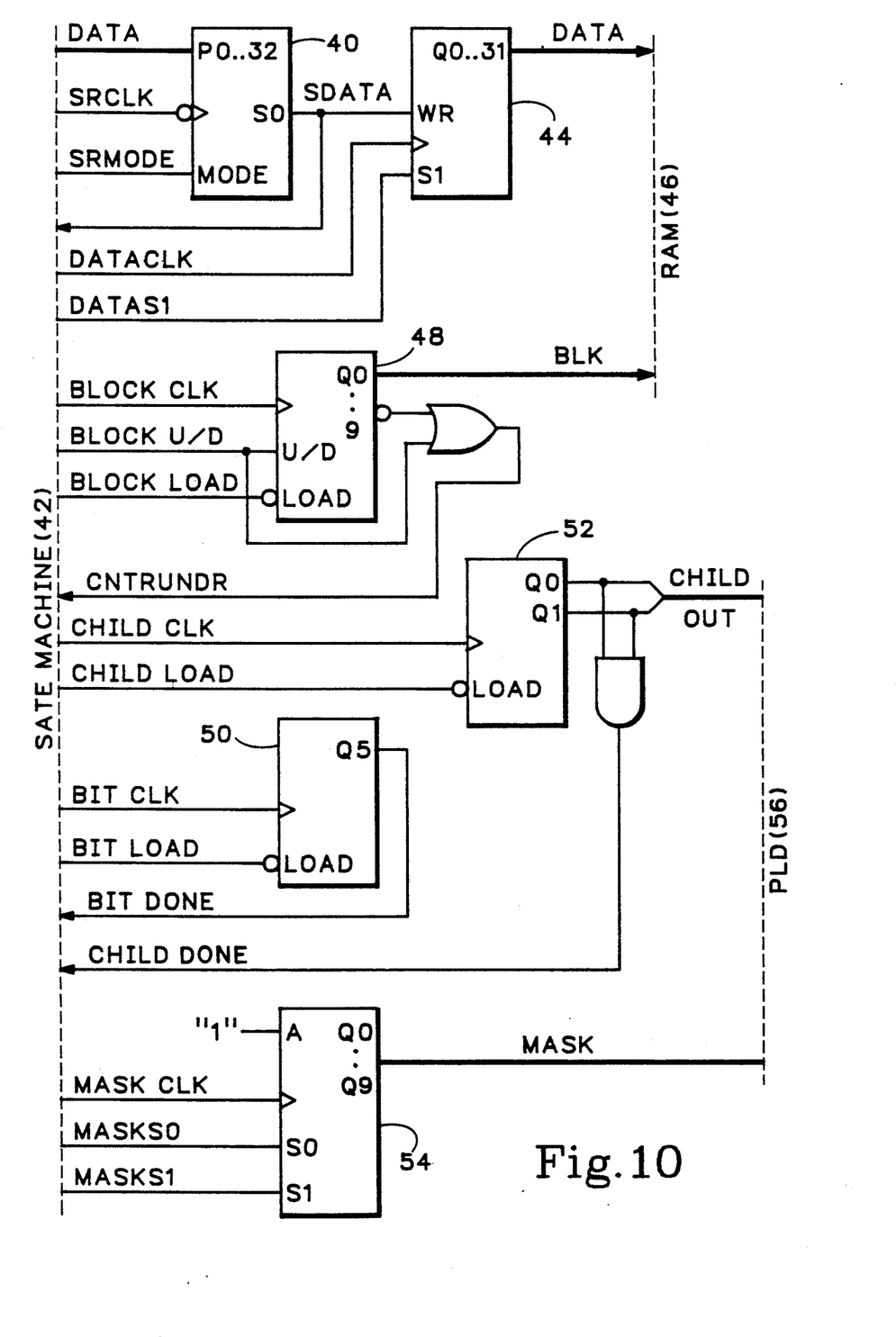
FIG. 10 is a schematic diagram of a decompression circuit for the decoder of FIG. 8.

FIG. 9 shows in greater detail the state machine 42 of the decoder, and FIG. 10 shows the associated decompression circuitry. The state machine 42 has a pair of master devices 62, 64 and a pair of slave devices 66, 68 that run from a clock signal CLK provided by the controller 58. A reset signal from the controller 58 resets the slave devices 66, 68 to a predetermined condition, and a FIFORDY signal from the controller indicates to the master devices 62, 64 when the memory 46 is ready to be filled with pixel data for the next frame. The first master device 62 provides a shift register clock SRCLK and mode SRMODE signal for input to the first shift register 40 to convert the incoming data into serial data SDATA. The serial data from the first shift register 40 is input to the master devices 62, 64 where the algorithm shown in FIG. 7 is performed. When the 32 bit block of intensity/channel values are detected by the state machine 42, the first master device 62 provides a data clock DATACLK and mode select DATAS1 to the second shift register 44 to clock the 24 bits of the intensity values into a parallel pixel data word for input to the memory 46. A pixel counter 70 and output NOR gate 72 respond to a pixel clock PIXELCLK and a pixel load signal PIXELLOAD from the second slave device 68 to provide a PIXELDONE signal for the first and second master devices 62, 64 and the second slave device 68 when the 24 bits of pixel intensity values have been clocked from the 32 bit data word, terminating the DATACLK signal from the first master device 62. A bit clock BITCLK and bit load signal BITLOAD signal from the second slave device 68 are input to the bit counter 50 that provides a BITDONE signal when the full 32 bits of the data value word have been processed.

Figure 11:
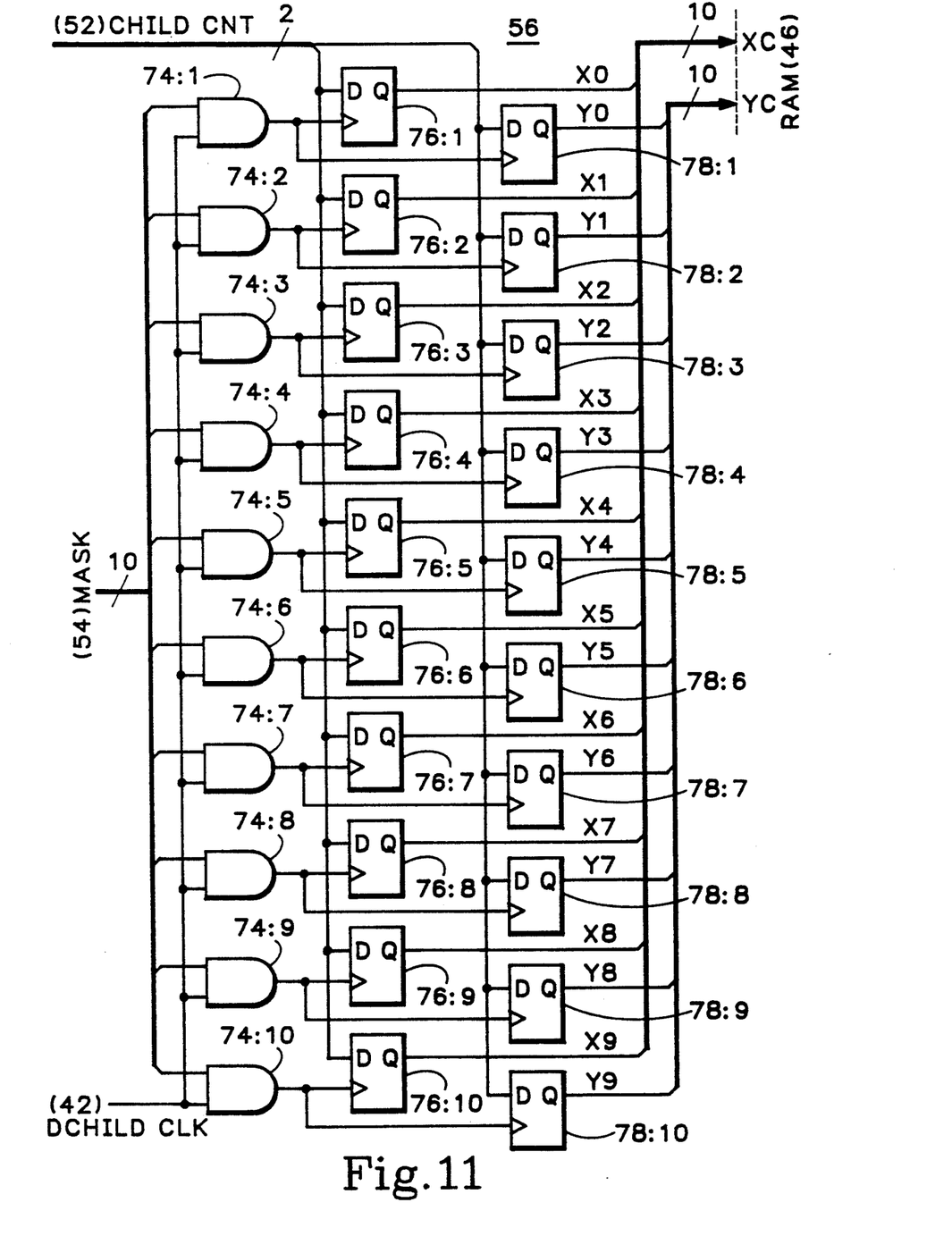
FIG. 11 is a schematic diagram of a programmable logic circuit for the decoder of FIG. 8.

The PLD 56 is shown in greater detail in FIG. 11. The PLD 56 has a plurality of logic gates and single bit latches. The mask data from the mask register 54 is input to one input of a plurality of AND gates 74:1–74:10. The mask data serves to enable selected ones of the AND gates 74 according to the block level of the subblock being decoded, i.e., determines the address offset. The other input to the AND gates 74 is a DCHILDCLK signal from the state machine 42. The outputs of the AND gates 74 are coupled to the clock inputs of respective latches 76:1–76:10, 78:1–78:10, i.e., the output of AND gate 74:1 is applied to the clock inputs of latches 76:1, 78:1, etc. One bit of the child count from the child counter 52 is applied to the D-input of one set of latches 76, and the other bit of the child count is applied to the D-input of the other set of latches 78. The outputs of the one set of latches 76 make up the XC address word for the memory 46, and the outputs of the other set of latches make up the YC address word for the memory. When the appropriate AND gates 74 are enabled by the mask signal, then the DCHILDCLK signal clocks the child count into the appropriate latches to provide the address for the current subblock.

For simplicity of hardware the above description was limited to RGB fields that all have the same size so that the same quadtree may be used for each of the fields. However for color video that is expressed in terms of a luminance component and two chrominance components, the described compression algorithm is applied separately to each of the component fields. This requires a separate channel for each component and interlacing of the chrominance compressed components with the corresponding luminance compressed components in the data formatting circuit 32, as is well understood by those in the art.

Another advantage of the above-described compress/decompress scheme is that it can accurately code both synthetic information, such as graphics, wireframes and other high frequency image data which is "illegal" in the strict television video sense, but which is very acceptable in "multi-media" systems or strictly graphic systems. For example a single color pixel width line is preserved by the adaptive spatial algorithm seeking out its edges at pixel or even sub-pixel levels. Other compression algorithms, such as JPEG and MPEG algorithms which use DCT, cannot preserve single pixel width colored lines except in the "lossless" mode where the DCT is turned off and only Huffman "entropy" encoding at 2–3:1 is used.

Thus the present invention provides an adaptive spatio-temporal compression/decompression algorithm for video image signals using a spatio-temporal quadtree based encoder and a corresponding decoder.

What is claimed is:

1. A method of adaptive spatio-temporally compressing/decompressing an image defined as an array of picture elements comprises the steps of:
    defining blocks of the picture elements as intermediate nodes and leaves according to a spatial quadtree hierarchy until all intermediary nodes are resolved into leaves, each leaf having an associated intensity value;
    assigning for each leaf a temporal bit indicative of whether a significant change in the intensity value has occurred between successive frames of the image; and encoding the intermediary nodes and leaves into a compressed data stream representative of the image having a first bit value for each intermediary node starting from the highest level of the spatial quadtree hierarchy and a second bit value for each leaf, each leaf where the temporal bit indicates the significant change being followed by a plurality of bits representing a new intensity value for that leaf.

2. A method as recited in claim 1 further comprising the step of decoding the compressed data stream by detecting each leaf where the temporal bit indicates the significant change and determining the corresponding range of addresses in a memory for updating the intensity values of the image with the new intensity value.

3. A method as recited in claim 2 wherein the decoding step comprises the steps of:
 initializing a decoder algorithm at the beginning of each frame of the image within the compressed data stream;
 testing each bit of the compressed data stream in sequence until a bit indicating a leaf is found;
 determining from the temporal bit of the leaf whether the new intensity value is present;
 specifying a block size indicating the number of pixels in the leaf and an address representing a starting location in the memory for the leaf;
 replacing the intensity values for the pixels of the leaf specified by the block size and address with the new intensity value; and
 repeating the testing and replacing steps until the image frame is complete.

4. A method as recited in claim 3 wherein the testing step comprises the steps of:
 checking the bit from the sequence to determine if it represents an intermediary node;
 decreasing the block size by a factor of two when the checked bit represents the intermediary node; and
 going on to the determining step when the checked bit represents the leaf.

5. An apparatus for adaptive spatio-temporal compressing/decompressing of an image comprising:
 means for converting a signal representing the image into a digital data stream representing intensity values for each pixel of the image;
 means for storing a sequential portion of the digital data stream representing a frame of the image;
 means for determining temporal difference values for the pixels between two frames of the image;
 means for encoding the digital data stream into a compressed data stream as a function of the temporal difference values using a quadtree hierarchy of intermediary nodes and leaves, each leaf including a temporal bit indicative of a significant change in the intensity values for that leaf between the two frames, the compressed data stream having a single bit for each intermediary node of the quadtree of a first value, two bits for each leaf with the first bit being of a second value and the second bit being the temporal bit, and a plurality of bits representing a new intensity value for the leaf after each pair of leaf bits where the temporal bit has a specified value.

6. An apparatus as recited in claim 5 further comprising means for decoding the compressed data stream to update a display memory at those locations representative of a leaf having the new intensity value.

7. An apparatus as recited in claim 6 wherein the decoding means comprises:
 means for identifying the leaf having the new intensity value from the compressed data stream;
 means for generating a start address for the display memory for the identified leaf;
 means for generating a block size from the identified leaf; and
 means for extracting the new intensity value from the identified leaf for storage in the display memory in locations determined by the start address and the block size.

* * * * *